United States Patent
Jones et al.

(10) Patent No.: US 7,204,472 B2
(45) Date of Patent: Apr. 17, 2007

(54) ACTIVE PRESSURE RELIEF VALVES AND METHODS OF USE

(75) Inventors: Gary L. Jones, Farmington Hills, MI (US); Paul R. Meernik, Redford, MI (US); Alan L. Browne, Grosse Pointe, MI (US); Jan H. Aase, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 73 days.

(21) Appl. No.: 11/064,422

(22) Filed: Feb. 23, 2005

(65) Prior Publication Data

US 2005/0199845 A1 Sep. 15, 2005

Related U.S. Application Data

(60) Provisional application No. 60/552,781, filed on Mar. 12, 2004, provisional application No. 60/552,791, filed on Mar. 12, 2004.

(51) Int. Cl.
*F16K 21/04* (2006.01)
(52) U.S. Cl. ................................. 251/129.06
(58) Field of Classification Search ............ 251/129.06
See application file for complete search history.

(56) References Cited

U.S. PATENT DOCUMENTS

| | | | | |
|---|---|---|---|---|
| 6,123,316 A | * | 9/2000 | Biegelsen et al. | ..... 251/129.01 |
| 6,991,280 B2 | * | 1/2006 | McKnight et al. | ........ 296/180.1 |
| 7,059,664 B2 | * | 6/2006 | Aase et al. | ............... 296/180.5 |
| 2002/0113380 A1 | | 8/2002 | Clark | .......................... 277/650 |
| 2004/0253566 A1 | | 12/2004 | Quinn et al. | |
| 2006/0157659 A1 | * | 7/2006 | MacGregor et al. | ........... 251/11 |

* cited by examiner

*Primary Examiner*—J. Casimer Jacyna
(74) *Attorney, Agent, or Firm*—Kathryn A. Marra

(57) ABSTRACT

Active pressure relief valves and methods of use for regulating atmospheric conditions within an interior compartment of a vehicle generally include an active material to effect movement of a flap relative to an opening. The active material has the ability to remember its original at least one attribute such as dimension, shape, and/or flexural modulus, which can subsequently be recalled by applying or removing an external stimulus, as will be discussed in detail herein. Suitable active materials include, without limitation, shape memory alloys, ferromagnetic shape memory alloys, shape memory polymers, piezoelectric materials, electroactive polymers, magnetorheological fluids and elastomers, electrorheological fluids, composites of one or more of the foregoing materials with non-active materials, combinations comprising at least one of the foregoing materials, and the like. Depending on the particular active material, the activation signal can take the form of, without limitation, an electric current, a temperature change, a magnetic field, a mechanical loading or stressing, or the like.

11 Claims, 6 Drawing Sheets

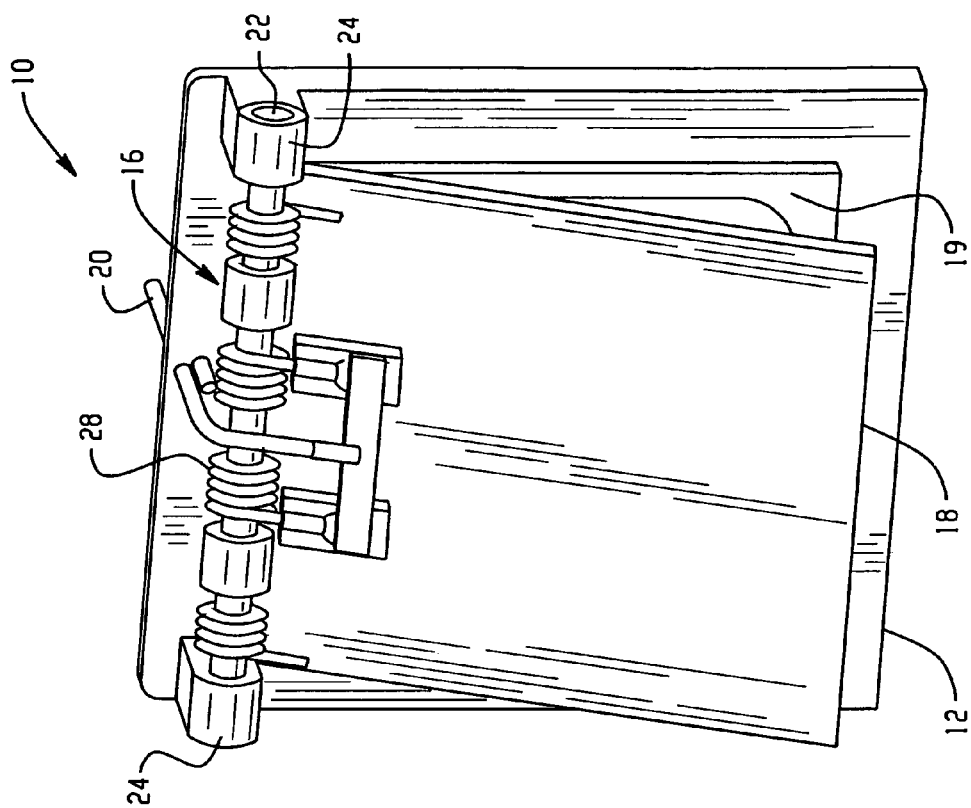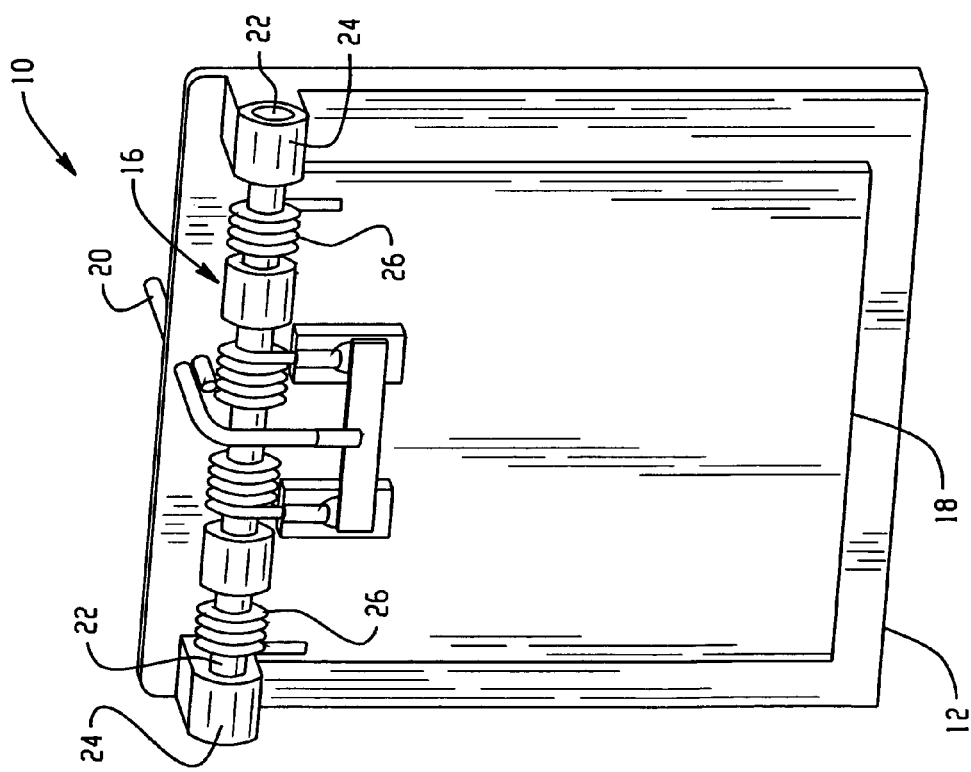

ACTIVE PRESSURE RELIEF VALVES AND METHODS OF USE

CROSS REFERENCE TO RELATED APPLICATIONS

The present application relates to and claims priority to U.S. Provisional Application No. 60/552,781 entitled, "Active Seal Assemblies" filed on Mar. 12, 2004 and U.S. Provisional Application No. 60/552,791 entitled, "Active Strut Assemblies", also filed on Mar. 12, 2004, the disclosures of which are incorporated by reference herein in their entireties.

BACKGROUND

This disclosure generally relates to seals and more particularly, to pressure relief valves and more particularly, to air pressure relief valves for regulating air pressure within an interior of a vehicle.

Vehicles are often fitted with pressure relief valves for ventilating an interior compartment of a vehicle. The pressure relief valves are generally located within an interior panel that interfaces with the exterior, e.g., the structural panel between the rear seat and trunk compartment, the structural panel between the floor and the external environment, the structural panel between the dashboard and the engine compartment, and the like. The pressure relief valve compensates for pressure differentials, many sudden, that may occur upon use of the vehicle. For example, cabin pressure will generally increase upon door closure, activation of the air bag, opening of a window during movement of the vehicle, and the like. As a result, the pressure differentials between the interior compartment and the external atmosphere can cause an increase in air buffeting (i.e., low level noise discomfort), an increase in door closure force, and the like. The use of the pressure vents can alleviate the pressure differentials.

Current pressure relief valves generally include one or more openings and a movable gate disposed over the openings. The gate moves in response to an air pressure differential across the pressure relief valve. For example, when air pressure within the interior compartment is greater than the external air pressure, the gate opens to compensate for as well as alleviate the increased pressure. In contrast, when the interior compartment air pressure is less than the external air pressure the movable gate covers the opening to prevent air from entering the interior compartment.

The actuation of current pressure relief valves is generally passive. That is, an air pressure differential between the interior compartment and the exterior is required to provide pressure relief.

Accordingly, it is desirable have an active pressure relief valve that can be selectively opened upon detection of an air pressure differential as well as selectively opened upon detection of other conditions, e.g., detection of poor air quality, excessive interior temperatures, and the like.

BRIEF SUMMARY

Disclosed herein are active pressure relief valves for an interior compartment of a vehicle. In one embodiment, a structural panel defining an interior compartment of a vehicle comprises an opening in the structural panel adapted to provide fluid communication with the interior compartment and an external environment; a flap in sealing communication with the opening; and an active material in operative communication with the flap, wherein the active material is effective to undergo a change in at least one attribute in response to an activation signal, wherein the change in at least one attribute moves the flap in relation to the opening.

An active pressure relief valve for regulating one or more atmospheric conditions in an interior compartment of a vehicle comprises a housing defining an opening in fluid communication with the interior compartment and an external environment; a hinge comprising an active material, wherein the active material is effective to undergo a change in at least one attribute in response to an activation signal; and a flap in operative communication with the hinge, wherein the change in at least one attribute moves the flap in relation to the opening.

In another embodiment, an active pressure relief valve comprises a housing defining an opening in fluid communication with the interior compartment and an external environment; a flap having one end in operative communication with a hinge; and an active material element attached to a free end of the flap and a stationary member spaced apart from the free end, wherein the active material is effective to undergo a change in at least one attribute in response to an activation signal, and wherein the change in the at least one attribute moves the flap in relation to the opening.

In yet another embodiment, the active pressure relief valve comprises a housing defining an opening in fluid communication with the interior compartment and an external environment; a flap in operative communication with a spring to bias the flap against the housing defining the opening; and an active material element attached to the flap and a stationary member spaced apart from the flap, wherein the active material is effective to undergo a change in at least one attribute in response to an activation signal, and wherein the change in the at least one attribute moves the flap in relation to the opening.

In still another embodiment, the active pressure relief valve comprises a housing defining an opening in fluid communication with the interior compartment and an external environment; a flap in operative communication with the opening; a linkage in operative communication with the flap; and an element formed of an active material in operative communication with the linkage, wherein the active material is effective to undergo a change in at least one attribute in response to an activation signal, and wherein the change in the at least one attribute moves the flap in relation to the opening.

In another embodiment, the active pressure relief valve comprises a housing defining an opening in fluid communication with the interior compartment and an external environment; and a flap in operative communication with the opening having one end fixedly attached to the housing, wherein the flap comprises an active material effective to undergo a change in at least one attribute in response to an activation signal, and wherein the change in the at least one attribute changes a shape orientation of the flap.

In still another embodiment, the active pressure relief valve comprises a housing defining an opening in fluid communication with the interior compartment and an external environment; and a flexible flap in operative communication with the opening having one end fixedly attached to the housing; an active material element attached to the flexible flap and a stationary member spaced apart from the flexible flap, wherein the active material is effective to undergo a change in at least one attribute in response to an activation signal, and wherein the change in the at least one attribute flexes the flexible flap.

In yet another embodiment an active pressure relief valve for regulating one or more atmospheric conditions in an interior compartment of a vehicle comprises a housing defining an opening in fluid communication with the interior compartment and an external environment; and a panel slidably disposed in the housing in operative communication with the opening having one end fixedly attached to an active material element, wherein the active material is effective to undergo a change in at least one attribute in response to an activation signal, and wherein the change in the at least one attribute slides the panel to expose a portion of the opening.

A method for operating an active pressure relief valve for regulating one or more atmospheric conditions in an interior compartment of a vehicle comprises positioning the active pressure relief valve in a structural panel defining the interior compartment, the active pressure relief valve comprising a flap in operative communication with an opening; and an active material in operative communication with the flap, wherein the active material is effective to undergo a change in at least one attribute in response to an activation signal, wherein the change in at least one attribute moves the flap in relation to the opening; selectively introducing the activation signal to the active material; and moving the flap away from the opening to provide fluid communication between the interior compartment and an external environment.

The above described embodiments and other features are exemplified by the following figures and detailed description.

BRIEF DESCRIPTION OF THE DRAWINGS

Referring now to the figures, which are exemplary embodiments and wherein like elements are numbered alike:

FIGS. 1–2 illustrate perspective front views of an active pressure relief valve in the closed and open positions, respectively, for regulating fluid flow between an interior vehicle compartment and an external environment in accordance with the present disclosure;

DETAILED DESCRIPTION

Figure 3:
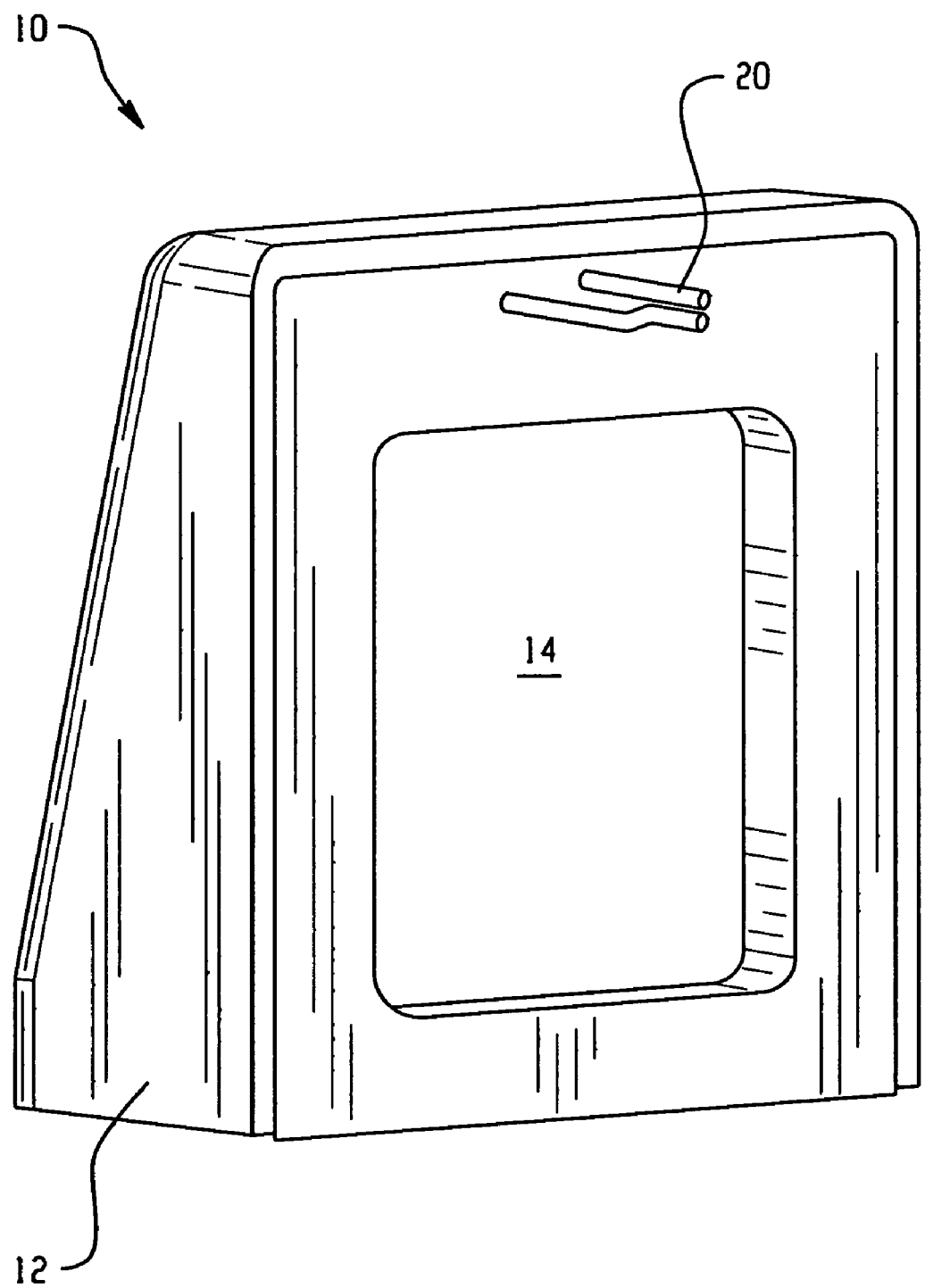
FIG. 3 illustrates a perspective rear view of the pressure relief valve of FIG. 1.

Disclosed herein are active pressure relief valves and methods of use for regulating atmospheric conditions within an interior compartment of a vehicle. In contrast to the prior art, the active pressure relief valves and methods of use disclosed herein advantageously are based on active materials. The use of the active materials provides a means for selectively opening and closing the pressure relief valves in the presence or absence of an air pressure differential. As such, the active pressure relief valves disclosed herein possess added functionality than previously known. For example, as will be disclosed in greater detail herein, the active pressure relief valve can be programmed to open upon detection of any condition. For example, a sensor for detecting carbon monoxide concentration within the interior compartment of a vehicle can be in operative communication with the active pressure relief valve to open when a certain concentration of carbon monoxide is detected, thereby allowing excess carbon monoxide to diffuse from the interior compartment and into the external atmosphere.

As another example the active pressure relief valve can be programmed to open when a certain temperature within the interior compartment is exceeded. For example, when a vehicle is parked and exposed to the mid-day sun, the temperature within the vehicle interior compartment can quickly exceed 150° Fahrenheit (F.). In this manner, the active pressure relief valve would function as a vent to the external atmosphere to provide a means for cooling the interior compartment. An optional fan can be employed with the active pressure relief valve to assist airflow from the external environment to flow into the vehicle interior compartment.

The term "active material" as used herein refers to several different classes of materials all of which exhibit a change in at least one attribute such as dimension, shape, and/or flexural modulus when subjected to at least one of many different types of applied activation signals, examples of such signals being thermal, electrical, magnetic, stress, and the like. One class of active materials is shape memory materials. These exhibit a shape memory. Specifically, after being deformed pseudoplastically, they can be restored to their original shape by the application of the appropriate field. In this manner, shape memory materials can change to the trained shape in response to an activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), magnetorheological fluids and elastomers (MR), electrorheological fluids (ER), composites of one or more of the foregoing materials with non-active materials, combinations comprising at least one of the foregoing materials, and the like. Depending on the particular active material, the activation signal can take the form of, without limitation, an electric current, a temperature change, a magnetic field, a mechanical loading or stressing, or the like.

Although reference will be made herein to automotive applications, it is contemplated that the active pressure relief valves can be employed for various non-automotive interfaces, wherein it is desirable to actively regulate air pressure relief between two regions and/or to provide ventilation between two regions. For automotive applications, the active pressure relief valves are preferably utilized in a selected one or more of the structural panels that define an interior vehicle compartment, wherein the pressure relief valve provides fluid communication between the interior vehicle compartment and an external environment.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

Figure 4:
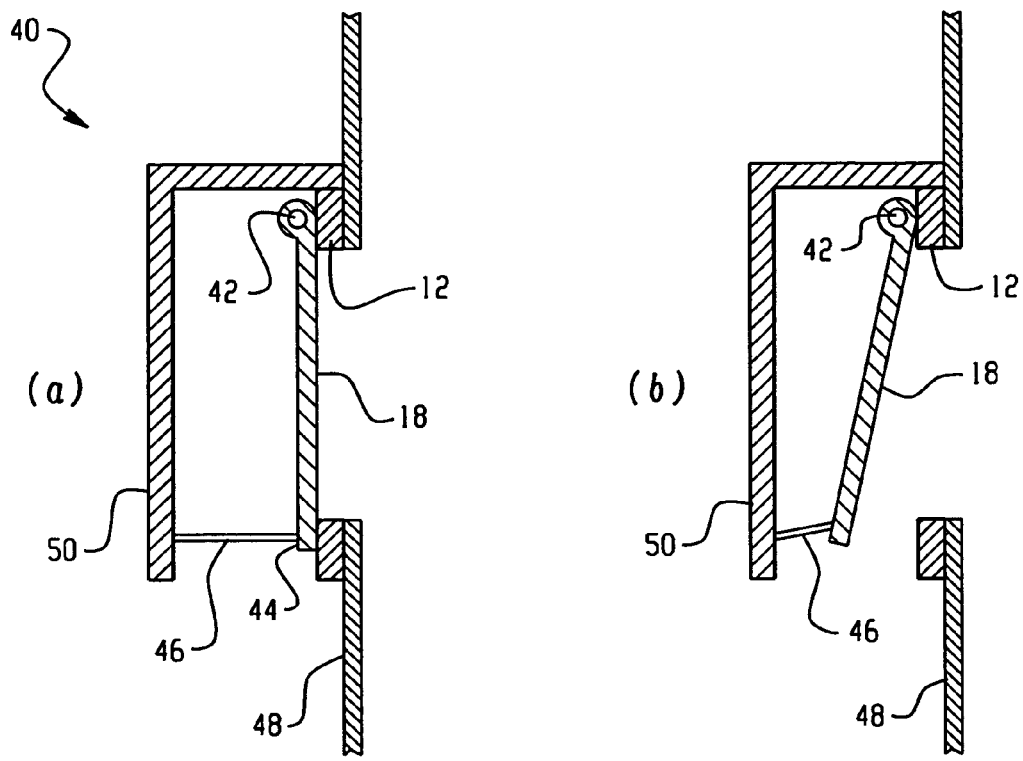
FIG. 4 illustrates a side cross sectional view of an active pressure relief valve in the open and closed positions in accordance with another embodiment
Figure 5:
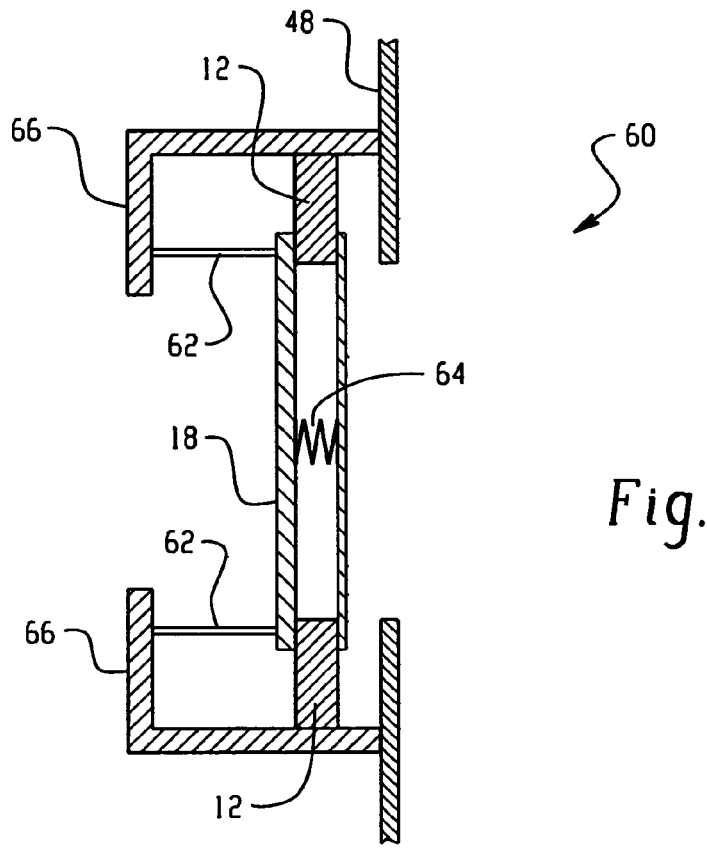
FIG. 5 illustrates a side cross sectional view of an active pressure relief valve in accordance with yet another embodiment.

Referring now to FIGS. 1–3, there are shown various perspective views of an active pressure relief valve 10 that utilizes an active material. The active pressure relief valve 10 generally includes a housing 12 defining an opening 14; a hinge 16 hingeably mounted to the housing 12; a rigid flap 18 in pivotable communication with the hinge 16; and a control connector 20 in operative communication with an activation device (not shown). In practice, the housing 12 of the pressure relief valve 10 is fixedly mounted to the structural panel (see e.g., interior surface 48 as shown in FIGS. 4 and 5) that defines the interior compartment of the vehicle. One or more active pressure relief valves may be utilized in the various structural panels that define the interior compartment.

The opening 14 is in fluid communication with the interior vehicle compartment and an external environment. In this manner, selective opening and closing of the flap 18 can be used to regulate fluid flow between the interior vehicle compartment and the external environment. The active pressure relief valve 10 may further comprise an elastic seal 19 about the opening 14 and intermediate the flap 18 and the housing 12. The seal 19 sealingly compresses upon closure of the flap 18 against the seal 19 to effectively prevent fluid flow. Although one flap 18 is depicted, it should be understood that multiple flaps per opening could be employed, if desired. The multiple flaps can operate in unison or individually to control fluid communication between the interior compartment and the external environment.

The hinge 16 comprises a pintle 22 rotatably mounted at each end within an apertured boss 24 attached to or extending from the housing 12. Disposed about the pintle 22 are a spring 28 formed of an active material intermediate a pair of bias springs 26. The bias springs can be formed of a non-shape memory material (e.g., a steel spring) or alternatively, of a shape memory material, if desired. In the power-off state (i.e., no activation signal), the bias springs 26 formed of the non-shape memory material maintain the active pressure relief valve in the closed position. That is, the rigid flap 18 is compressed against the housing 12 prevent fluid communication between the interior compartment and the external environment. Alternatively, bias springs 26 formed of a shape memory material can be selectively activated to provide return of the flap to the closed position. In the power-on, the shape memory material is activated so as to provide a change in a property thereof such as shape change. The change in the property causes the spring 28 to overcome the forces associated with the bias springs 26 and rotate the flap 18 to an open position. In two additional variations of this embodiment, EAP or piezoelectric actuators (the latter through appropriate gearing) could be used to open the valve. In both of these cases, a bias spring would not be needed to effect return as this would occur automatically through the return of the active material to its original state upon removal of the activation signal. As an example of a hybrid combination, a combination of SMP and SMA could be used. As an example of how this combination could be employed, the two active materials could be arranged in parallel with the SMA initially deformed pseudo-plastically from its "memorized" geometry. Both SMP and SMA would be activated, the SMP going to its low modulus state, the SMA to its high modulus state, and the SMA then being dramatically more free to produce rotation against the action of the bias spring as it returns to its memorized shape. The SMP would then be cooled, in so doing locking the flap open allowing zero power hold. To cause the flap to return, the SMP could be reheated with the SMA remaining cool, and with both SMP and SMA in their low modulus state the bias spring then would act to close the gap. Another envisioned hybrid is of SMA and either MR or ER fluid. The MR/ER fluid would be between the rotating pivot shaft and a fixed co-axial sheath, e.g., in a sleeve defined by the apertured boss 24. With no field applied to the MR/ER fluid, actuation of the SMA would swing the flap open. A field could then be applied to the MR/ER fluid increasing its yield strength in so doing locking the flap open. Cooling of the SMA plus removal of the field applied to the MR/ER fluid would result in the bias spring shutting the flap.

A power supply is in operative communication with the active material based spring 28 via the control connector 20 so as to provide a suitable activation signal. For example, in the case of springs 28 formed of a shape memory alloy, a current can be supplied by the power supply to resistively heat the spring 28.

Shape memory alloys generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior. Generally, the shape memory alloys are softer and more easily deformable in their martensitic phase and are harder, stiffer, and/or more rigid in the austenitic phase. Thus, a suitable activation signal for use with shape memory alloys is a thermal activation signal having a magnitude to cause transformations between the martensite and austenite phases. The results of the phase transformations include, among others, a change in the shape, dimensional, and/or modulus properties of the shape memory alloy.

In the present example, upon resistive heating of the shape memory alloy spring 28 an increase in modulus by a factor of 2.5 to 3.0 can be observed such that the force exerted by spring 28 is greater than the return force associated with the bias springs 26, thereby causing the rigid flap 18 to move to an open position (see FIG. 2). Discontinuation of the activation signal causes the shape memory alloy spring 28 to cool in so doing lowering their modulus by a factor of 2.5 to 3.0. In this manner, the forces associated with the shape memory alloy spring 28 are below that of the bias springs 26, thereby causing the bias springs 26 to stretch the shape memory alloy wire (stress induced transformation to a martensite phase) and sealingly close the flap 18 against the housing 12.

Selective opening of the rigid flap 18 can be effected by a controller (not shown) in operative communication with the power supply. The controller can be preprogrammed to have the power supply deliver an activation signal suitable for the particular active material using algorithms based on a sensor input. For example, air pressure can be monitored with a sensor to indicate when a window is opened during vehicle movement, or when an air bag is actuated, or upon door closing, or the like. Alternatively, other sensor inputs such a temperature indicating that the interior temperature of the vehicle has exceeded a pre-set temperature, and the like can be employed. Still, other sensor inputs can include a gas sensor such as may be desired for detecting carbon monoxide concentration within the interior compartment. Suitable algorithms and sensor inputs are well within the skill of those in the art in view of this disclosure.

Referring now to FIG. 4, there is shown a cross section of an active pressure relief valve 40 in accordance with another embodiment. In this embodiment, the rigid flap 18 is pivotably mounted to the housing 12 at one end using conventional means, e.g., a hinge 42. The housing 12 is fixedly attached to an interior vehicle surface 48 in the manner as previously discussed to provide fluid communication between an interior compartment of the vehicle and an external environment. At the other end 44 of the rigid flap 18, an element 46 of a defined length that is formed of the active material is attached. One end of the element 46 is attached to the rigid flap and the other end is attached to a rigid and stationary member 50 spaced apart from the housing 12. Upon activation of the active material based element 46 with a suitable activation signal, the length dimension of the element 46 decreases causing the rigid flap 18 to pivot about the hinge 42. Upon discontinuing the activation signal, the active material based element 46 returns to its original dimension or undergoes a plastic deformation, depending on the active material employed to effect closure of the flap 18. A bias spring may be employed in the hinge to produce said plastic deformation and/or so that effective closure of the flap 18 is maintained against the housing 12 in the power—off state.

FIG. 5 shows a cross section of an active pressure relief valve 60, wherein the rigid flap 18 is suspended in position by at least one element 62, two of which are shown. The housing 12 is fixedly attached to an interior vehicle surface 48 in the manner as previously discussed to provide fluid communication between an interior compartment of the vehicle and an external environment. A return spring 64 is attached to the rigid flap 18 to sealingly maintain the rigid flap 18 against the housing 12. One end of the element 62 is attached to the rigid flap 18 and the other end is attached to a rigid and stationary member 66 spaced apart from the housing 12. The flap 18 is movable and is biased as to form an obstruction or closure for the opening by a return spring 64. Upon receiving an actuation signal the active element contracts and moves the flap to an opened position. When the signal is removed the flap 18 will return to its biased or closed position due to the force by the return spring 64.

Figure 6:
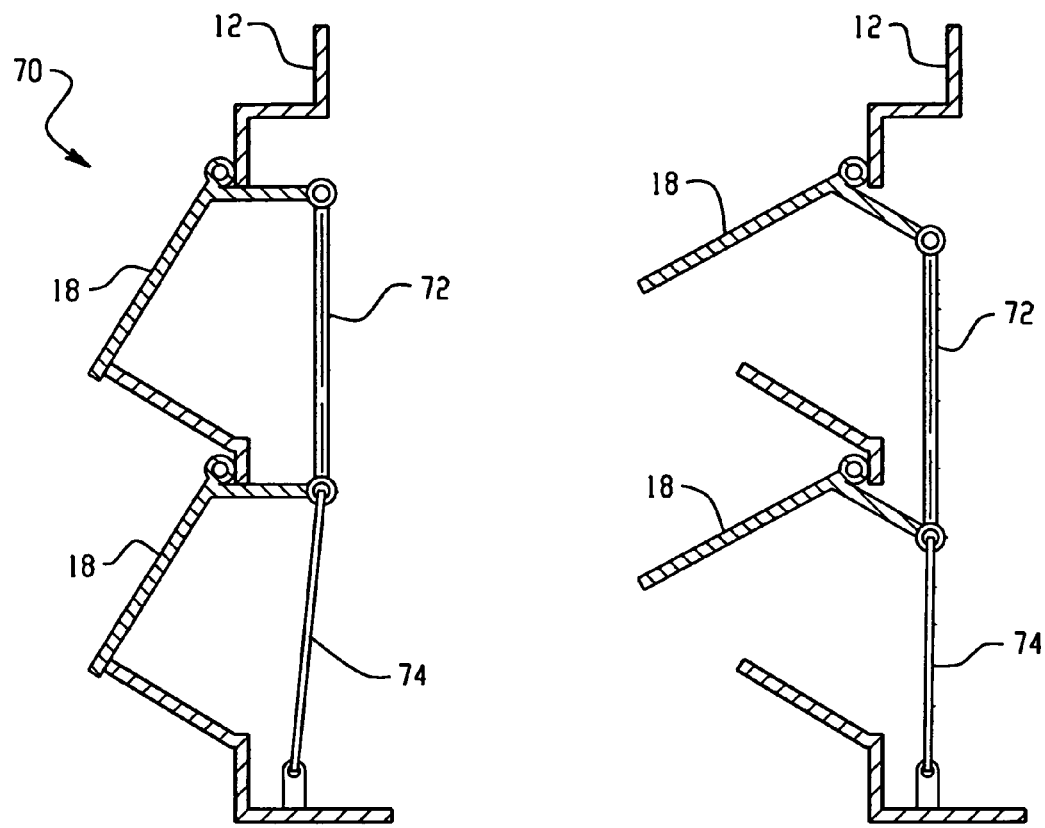
FIG. 6 illustrates a side cross sectional view of an active pressure relief valve in the open and closed positions in accordance with another embodiment.

FIG. 6 depicts an active pressure relief valve 70 employing a plurality of flaps 18. The active pressure relief valve 70 generally includes one or more pivotable linkages 72 in operative communication with the flap 18, wherein an active material based element 74 controls movement of the pivotable linkages 72. The flaps 18 are movable about a pivot point defined by the pivotable linkages 72 and are biased as to form a closure for the opening. Upon receiving an actuation signal the active element 74 contracts and causes the flaps 18 to move to an opened position. When the activation signal is removed, the flaps 18 will return to its biased or closed position either by themselves and/or through the action of a biasing spring depending on the particular active material employed.

Figure 7:
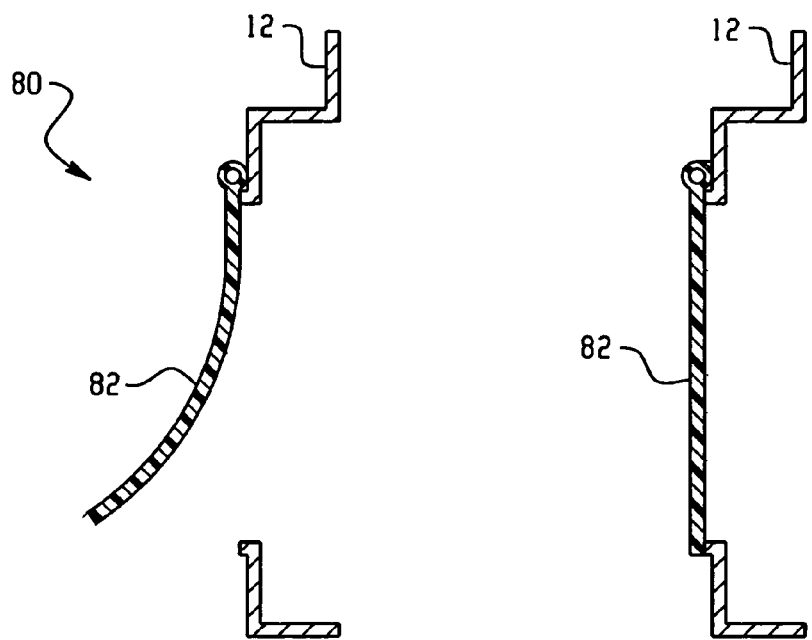
FIG. 7 illustrates a side cross sectional view of an active pressure relief valve in the open and closed positions in accordance with another embodiment.

FIG. 7 depicts an active pressure relief valve 80 generally comprising a flap 82 formed of the active material. The flap 82 is fixedly attached at one end to the housing 12. Activation of the active material causes the flap 82 to change its shape orientation causing the flap to move to an open position. For example, the flap 82 can be fabricated of a shape memory polymer. Upon activation of the shape memory polymer (e.g., heated above the glass transition temperature of its lower temperature phase), the modulus drops significantly (in some embodiments, by over a factor of 30) to allow escape of pressurized air. Once the pressure between the interior compartment and the external environment equilibrates, the flap 82 returns to the closed position. The flap can be fabricated from a variety of active materials as well as composites of active materials with non-active materials or other active materials. For example, flap 82 can be formed of a magnetorheological rubber, that can be engineered to bend upon activation (e.g., an applied magnetic field) so as to open the flap 82 and then straighten and close upon removal of the magnetic field. Likewise, the flap can be formed of an electroactive polymer or piezoceramic composite material so as to create an opening upon application of a voltage.

Figure 8:
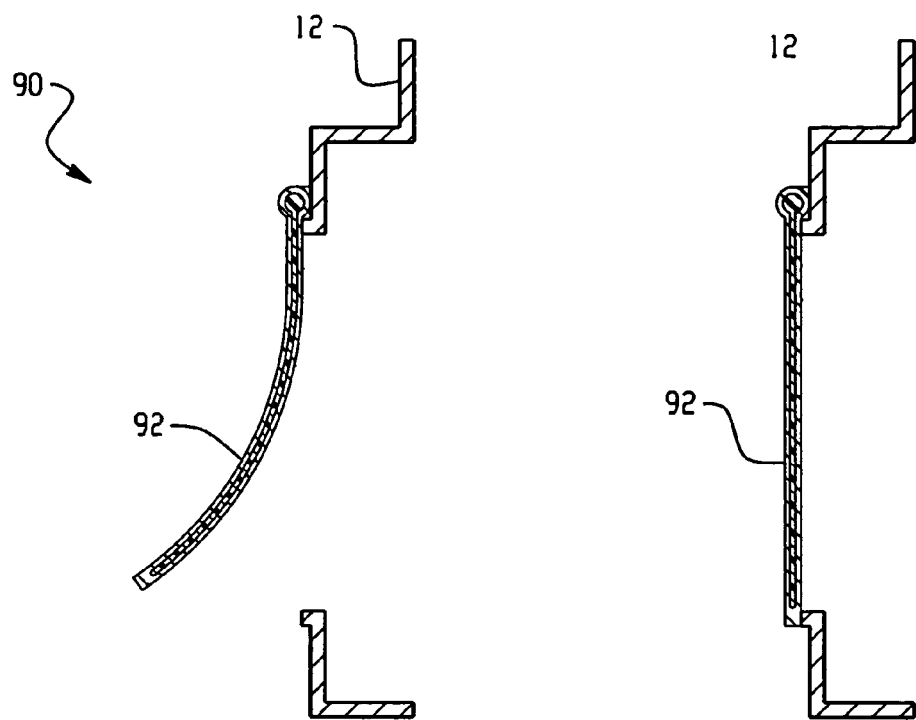
FIG. 8 illustrates a side cross sectional view of an active pressure relief valve in the open and closed positions in accordance with another embodiment.

FIG. 8 depicts an active pressure relief valve 90 in accordance with another embodiment. In this embodiment, an active material is embedded within a flexible flap 92 to effect selective opening and closing of the pressure relief valve, wherein the flap 92 is fixedly attached at one end to the housing 12. For example, a shape memory alloy can be embedded within a flexible material to morph its geometry upon resistive heating the shape memory alloy. In this manner, the shape memory alloy undergoes a phase transformation of its crystal structure, e.g., a martensite to austenite phase transformation. As another example, the flap 92 is formed of a piezoceramic bimorph material, which can be embedded within a flexible material. Activation of the piezoceramic bimorph material with an effective voltage causes the flap to undergo a change in shape from a planar configuration (closed position) to a curled configuration (open position). Discontinuation of the voltage signal causes the flap 92 to return to the planar configuration.

Figure 9:
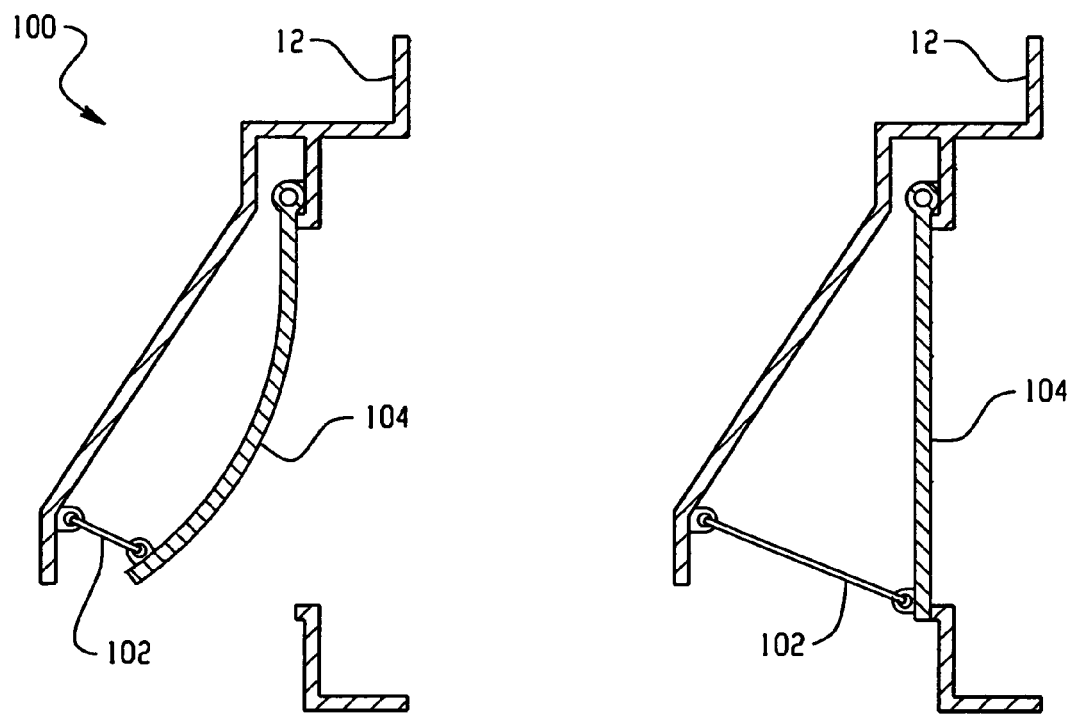
FIG. 9 illustrates a side cross sectional view of an active pressure relief valve in the open and closed positions in accordance with another embodiment.

FIG. 9 depicts an active pressure relief valve 100 comprising an element 102 formed of an active material attached to one end of a flexible flap 104 and a stationary member 106 such as to create an opening 14 when the element 102 is activated and then return under a biasing force of the elastic constant of the flexible flap material upon deactivation. In this embodiment, the flexible flap is fixedly attached to the housing 12 at an end distally located from the attached element 102. Activation of element 102 causes flexure of the flap 104.

Figure 10:
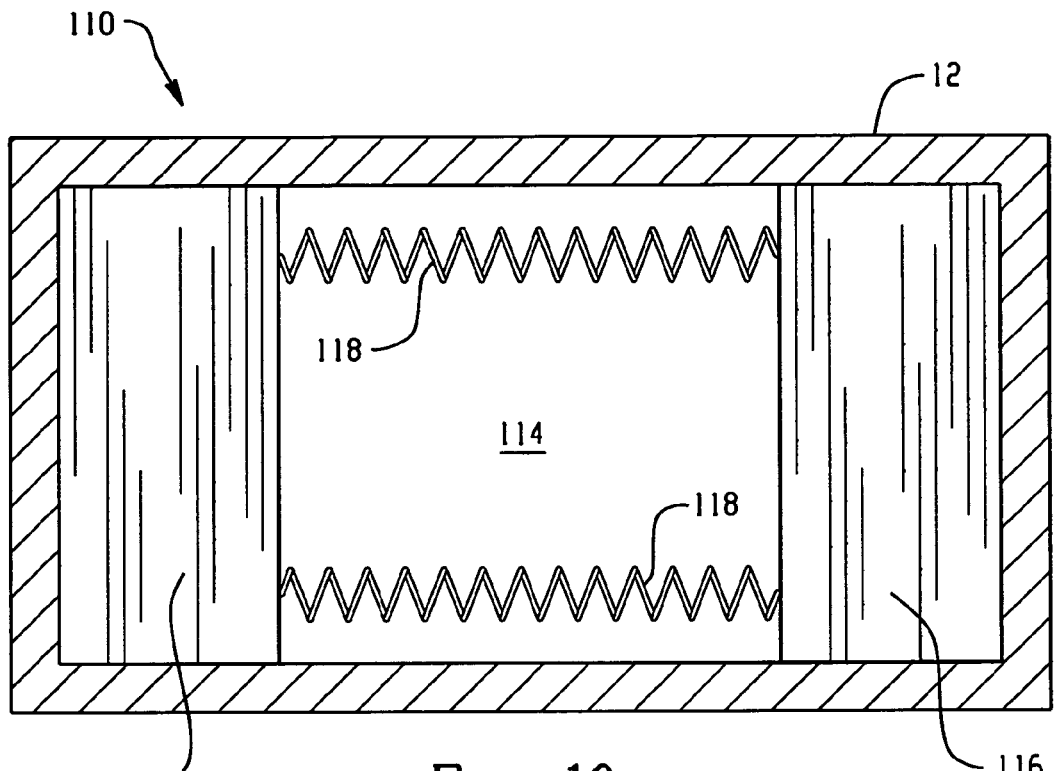
FIGS. 10 and 11 illustrate a side plan view of an active pressure relief valve in the closed and open positions, respectively, in accordance with another embodiment.
Figure 11:
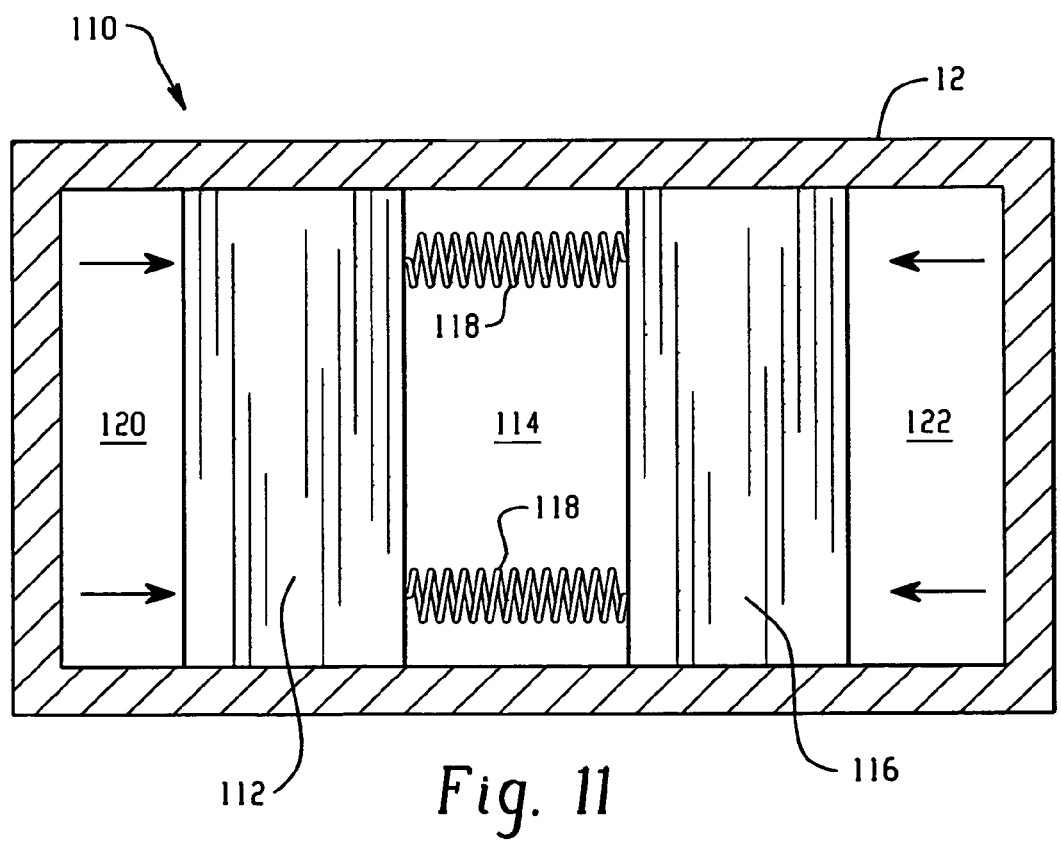

FIGS. 10 and 11 illustrate a plan view of an active pressure relief valve 110 in the closed and opened positions, respectively. The active pressure relief valve 110 includes sliding panels 112 and 116 slidably disposed within the housing 12. A stationary panel 114 is centrally located between panels 112 and 116. Attached to the panels 112, 116 are active material elements 118. For example, the active material element is a spring formed of a shape memory alloy. Upon activation of the active material element 118, the length dimension of the element contracts and causes the panels 112 and 116 to slide and expose portions 120, 122 of opening 14. In this manner, fluid communication selectively occurs between the interior vehicle compartment and external environment. Optionally, a bias spring can be employed to provide a return mechanism (i.e., closed position). Although three panels 112, 114, and 116 are shown, it is not intended to be limited to three panels. Its well within the skill of those in the art to modify the relief valve to include more or less panels as may be desired for various applications and configurations.

In addition to the thermally activated shape memory alloys discussed above, various other active materials can be employed for the embodiments disclosed herein. Suitable active materials include ferromagnetic SMAs, shape memory polymers (SMP), piezoelectric materials, electroactive polymers (EAP), magnetorheological fluids and elastomers (MR), electrorheological fluids (ER), composites of one or more of the foregoing materials with non-active materials, combinations comprising at least one of the foregoing materials, and the like.

As previously discussed, suitable shape memory materials that can undergo a shape change in response to an activation signal include shape memory alloy compositions. Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the airflow control devices with shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, changes in yield strength, and/or flexural modulus properties, damping capacity, and the like. A preferred shape memory alloy is a nickel-titanium based alloy commercially available under the trademark FLEXINOL from Dynalloy, Inc. Selection of a suitable shape memory alloy composition generally depends on the temperature range where the component will operate.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape orientation is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 300° C. After expansion by fluid, the permanent shape is regained when the applied force is removed, and the expanded SMP is again brought to or above the highest or last transition temperature of the SMP.

The Tg of the SMP can be chosen for a particular application by modifying the structure and composition of the polymer.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadienestyrene block copolymers, and the like.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but, are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A structural panel defining an interior compartment of a vehicle, the structural panel comprising:
    an opening in the structural panel adapted to provide fluid communication with the interior compartment and an external environment;
    a flap in sealing communication with the opening; and
    an active material in operative communication with the flap, wherein the active material is effective to undergo a change in at least one attribute in response to an activation signal, wherein the change in at least one attribute moves the flap in relation to the opening, wherein the flap is hinged to a housing about the opening, wherein the active material is a spring disposed about a rotatable pintle, wherein the active material spring is in operative communication with the flap.

2. The structural panel of claim 1, wherein the active material comprises shape memory alloys, ferromagnetic shape memory alloys, shape memory polymers, piezoelectric materials, electroactive polymers, magnetorheological fluids and elastomers, electrorheological fluids, composites of one or more of the foregoing materials with non-active materials, and combinations comprising at least one of the foregoing materials.

3. The structural panel of claim 1, further comprising at least one biased spring disposed about the pintle.

4. The structural panel of claim 1, wherein the activation signal comprises an electric current, a temperature change, a magnetic field, a mechanical loading or stressing and combinations comprising at least one of the foregoing signals.

5. An active pressure relief valve for regulating one or more atmospheric conditions in an interior compartment of a vehicle, the active pressure relief valve comprising:
    a housing defining an opening in fluid communication with the interior compartment and an external environment;
    a hinge comprising an active material, wherein the active material comprises is effective to undergo a change in at least one attribute in response to an activation signal; and
    a flap in operative communication with the hinge, wherein the change in at least one attribute moves the flap in relation to the opening, wherein the flap is hinged to the housing, wherein the active material is a spring disposed about a rotatable pintle and is configured to move the flap in relation to the opening in response to the activation signal.

6. The active pressure relief valve of claim 5, wherein the spring formed of the active material is adapted to move the flap away from the opening in response to the activation signal; and the hinge further comprises a return spring adapted to return the flap to seal the opening in the absence of the activation signal.

7. The active pressure relief valve of claim 5, wherein the one or more atmospheric conditions comprise a pressure, a temperature, a gas concentration, and combinations comprising at least one of the foregoing atmospheric conditions.

8. The active pressure relief valve of claim 5, wherein the active material comprises shape memory alloys, ferromagnetic shape memory alloys, composites of one or more of the foregoing materials with non-active materials, and combinations comprising at least one of the foregoing materials.

9. A method for operating an active pressure relief valve for regulating one or more atmospheric conditions in an interior compartment of a vehicle comprises:
    positioning the active pressure relief valve in a structural panel defining the interior compartment, the active pressure relief valve comprising a flap fixedly attached to a rotatable pintle in operative communication with an opening; and an active material spring disposed about the rotatable pintle and in operative communication with the flap, wherein the active material comprises an active material effective to undergo a change in at least one attribute in response to an activation signal, wherein the change in at least one attribute moves the flap in relation to the opening;
    selectively introducing the activation signal to the active material; and
    moving the flap away from the opening to provide fluid communication between the interior compartment and an external environment.

10. The active pressure relief valve of claim 9, wherein the one or more atmospheric conditions comprise a pressure, a temperature, a gas concentration, and combinations comprising at least one of the foregoing atmospheric conditions.

11. The active pressure relief valve of claim 9, wherein the active material comprises shape memory alloys, ferromagnetic shape memory alloys, shape memory polymers, electroactive polymers, magnetorheological elastomers, piezoelectric materials, composites of one or more of the foregoing materials with non-active materials, and combinations comprising at least one of the foregoing materials.

* * * * *